(12) United States Patent
Young et al.

(10) Patent No.: US 8,824,619 B2
(45) Date of Patent: *Sep. 2, 2014

(54) STEAM GENERATOR FLOW BY-PASS SYSTEM

(71) Applicant: NuScale Power, LLC, Corvallis, OR (US)

(72) Inventors: Eric Paul Young, Corvallis, OR (US); John T. Groome, Corvallis, OR (US); Jose N. Reyes, Jr., Corvallis, OR (US)

(73) Assignee: NuScale Powe, LLC, Corvallis, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/860,750

(22) Filed: Apr. 11, 2013

(65) Prior Publication Data

US 2013/0266111 A1    Oct. 10, 2013

Related U.S. Application Data

(63) Continuation of application No. 12/272,175, filed on Nov. 17, 2008, now Pat. No. 8,437,446.

(51) Int. Cl.
*G21C 9/00*   (2006.01)
*G21C 1/32*   (2006.01)
*G21C 15/18*  (2006.01)
*G21C 15/26*  (2006.01)

(52) U.S. Cl.
CPC ............... *G21C 15/18* (2013.01); *G21C 1/322* (2013.01); *Y02E 30/40* (2013.01); *G21C 15/26* (2013.01)
USPC ............ 376/277; 376/282; 376/298; 376/299

(58) Field of Classification Search
USPC .................................. 376/282, 299, 298, 277
See application file for complete search history.

(56) References Cited

U.S. PATENT DOCUMENTS 3,401,082 A   9/1968   Ammon et al.
3,599,589 A   8/1971   Busey
(Continued)

FOREIGN PATENT DOCUMENTS

CN   1080769 A   1/1994
EP   518593 A1   12/1992
(Continued)

OTHER PUBLICATIONS

Reyes et al, "Testing of the multi-application small light water reactor (MASLWR) passive safety systems", Nuclear Engineering and Design, Amsterdam, NL, vol. 237, No. 18, Aug. 25, 2007, pp. 1999-2005.

(Continued)

*Primary Examiner* — Timothy A Brainard
(74) *Attorney, Agent, or Firm* — Fish & Richardson P.C.

(57) ABSTRACT

A nuclear reactor module includes a reactor vessel and a reactor housing mounted inside the reactor vessel, wherein the reactor housing comprises a shroud and a riser located above the shroud. The nuclear reactor module further includes a heat exchanger proximately located about the riser, and a reactor core located in the shroud. A steam generator by-pass system is configured to provide an auxiliary flow path of primary coolant to the reactor core to augment a primary flow path of the primary coolant out of the riser and into the shroud, wherein the auxiliary flow path of primary coolant exits the reactor housing without passing by the heat exchanger.

27 Claims, 9 Drawing Sheets

(56) References Cited

U.S. PATENT DOCUMENTS

| | | | |
|---|---|---|---|
| 3,856,688 A | 12/1974 | Kenney et al. | |
| 4,045,285 A | 8/1977 | Baumgaertner | |
| 4,554,129 A | 11/1985 | Peinado et al. | |
| 4,725,400 A | 2/1988 | Elter et al. | |
| 4,793,964 A | 12/1988 | Fajeau | |
| 5,053,190 A | 10/1991 | Gardner et al. | |
| 5,087,408 A | 2/1992 | Tominaga et al. | |
| 5,089,216 A | 2/1992 | Schlonski | |
| 5,102,616 A * | 4/1992 | Gardner et al. | 376/282 |
| 5,120,493 A | 6/1992 | Marquino | |
| 5,217,682 A | 6/1993 | Spinks | |
| 5,276,720 A | 1/1994 | Oosterkamp et al. | |
| 5,349,617 A | 9/1994 | Gautier | |
| 6,795,518 B1 | 9/2004 | Conway et al. | |
| 8,437,446 B2 * | 5/2013 | Young et al. | 376/282 |
| 2002/0122526 A1 * | 9/2002 | Hidaka et al. | 376/283 |
| 2005/0018806 A1 | 1/2005 | Gautier | |
| 2006/0146975 A1 | 7/2006 | Okamura et al. | |

FOREIGN PATENT DOCUMENTS

| | | | |
|---|---|---|---|
| FR | 1445877 A | 7/1966 |
| JP | 58172581 A | 10/1983 |
| JP | 2311794 A | 12/1990 |
| JP | 5188172 A | 7/1993 |
| JP | 6066983 U | 9/1994 |
| JP | 7134193 A | 5/1995 |
| JP | 2002156485 A | 5/2002 |
| JP | 2004012145 A | 1/2004 |
| JP | 2005510744 T | 4/2005 |

OTHER PUBLICATIONS

Foreign office action Article 94(3) EPC for Application No. 09760391.4-2208, dated Apr. 3, 2012, 7 pages.

Dr. Jose N. Reyes, Jr., "NuScale Power Introduction to NuScale Design" U.S. Nuclear Regulatory Commission Pre-Application Meeting, Rockville, MD, Jul. 24, 2008, 26 pages.

European Patent Office, "International Search Report" for International Application No. PCT/US2009/064817, Feb. 25, 2010, 17 pages.

Modro, S.M., et al.; "Multi-Application Small Light Water Reactor Final Report"; Idaho National Engineering and Environmental Laboratory; Dec. 2003, Idaho Falls, ID, USA, 116 pages.

IAEA; IAEA Tecdoc 1391—Status of Advanced Light Water Reactor Designs 2004; May 2004; pp. 279-306, 489-512; Nuclear Power Technology Development Section, International Atomic Energy Agency; Vienna, Austria.

IAEA; IAEA Tecdoc 1485—Status of Innovative Small and Medium Sized Reactor Designs 2005; Mar. 2006; pp. 93-162; Nuclear Power Technology Development Section, International Atomic Energy Agency; Vienna, Austria.

Second Office Action for Chinese Application No. 200980153552.3, issued Jan. 2, 2014, 12 pages.

First Office Action for Chinese Application No. 200980153552.3, issued Jun. 3, 2013, 10 pages.

Official Action for Canadian Application No. 2,745,703, dated Jun. 5, 2013, 2 pages.

Japan Patent Office, Non-Final Rejection for Japanese Application No. 2011-536599, dated Feb. 12, 2014, 5 pages.

Non-Final Rejection for Korean Application No. 10-2011-7013842, dated Oct. 23, 2012, 10 pages.

* cited by examiner

//* # STEAM GENERATOR FLOW BY-PASS SYSTEM

CROSS-REFERENCE TO RELATED APPLICATION

This application claims priority under 35 U.S.C. §120 to, and is a continuation of, U.S. patent application Ser. No. 12/272,175, filed Nov. 17, 2008, and entitled "STEAM GENERATOR FLOW BY-PASS SYSTEM," the contents of which are incorporated herein by reference in their entirety.

TECHNICAL FIELD

The present disclosure relates to a system for removing decay heat from a nuclear reactor.

BACKGROUND

Figure 1:
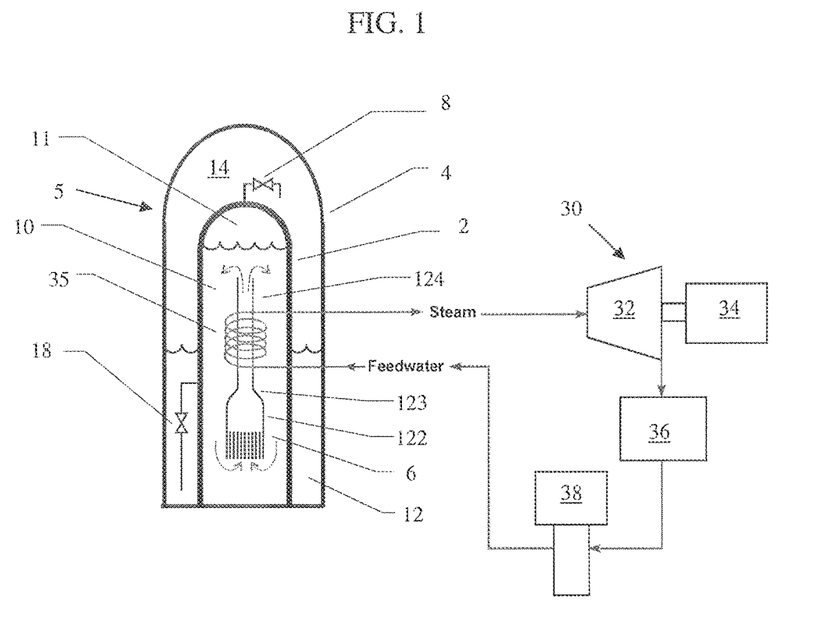
FIG. 1 illustrates a nuclear power system.

In nuclear reactors designed with passive operating systems, the laws of physics are employed to ensure that safe operation of the nuclear reactor is maintained during normal operation or even in an emergency condition without operator intervention or supervision, at 10 least for some predefined period of time. A nuclear reactor 5 includes a reactor core 6 surrounded by a reactor vessel 2. Water 10 in the reactor vessel 2 surrounds the reactor core 6. The reactor core 6 is further located in a shroud 122 which surround the reactor core 6 about its sides. When the water 10 is heated by the reactor core 6 as a result of fission events, the water 10 is directed from the shroud 122 and out of a riser 124. This results in further 15 water 10 being drawn into and heated by the reactor core 6 which draws yet more water 10 into the shroud 122. The water 10 that emerges from the riser 124 is cooled down and directed towards the annulus 123 and then returns to the bottom of the reactor vessel 2 through natural circulation. Pressurized steam 11 is produced in the reactor vessel 2 as the water 10 is heated.

A heat exchanger 35 circulates feedwater and steam in a secondary cooling system 30 in order to generate electricity with a turbine 32 and generator 34. The feedwater passes through the heat exchanger 35 and becomes super-heated steam. The secondary cooling system 30 includes a condenser 36 and feedwater pump 38. The steam and feedwater in the secondary cooling system 30 are isolated from the water 10 in the reactor vessel 2, such that they are not allowed to mix or come into direct contact with each other.

The reactor vessel 2 is surrounded by a containment vessel 4. The containment vessel 4 is designed so that water or steam from the reactor vessel 2 is not allowed to escape into the surrounding environment. A steam valve 8 is provided to vent steam 11 from the reactor vessel 2 into an upper half 14 of the containment vessel 4. A submerged blowdown valve 18 30 is provided to release the water 10 into suppression pool 12 containing sub-cooled water.

During a loss of feedwater flow, the nuclear reactor 5 is designed to respond by scramming the reactor core 6, flooding the containment vessel 4 or depressurizing the reactor vessel 2. The latter two of these responses result in the nuclear reactor 5 being shut down and unable to generate electricity for an extended period of time. Furthermore, during a loss of coolant condition where coolant is expelled from the reactor vessel 2, a flow of coolant through the reactor core 6 is reduced. This increases the time needed to bring the reactor core temperatures down to a desired level.

SUMMARY

A power module assembly is disclosed as comprising a reactor housing, a reactor core located in a lower portion of the reactor housing, and a heat exchanger proximately located about an upper portion of the reactor housing. The primary coolant flows out of the reactor housing via the upper portion, and the primary coolant flows into the reactor housing via the lower portion. The power module assembly further comprises a passageway provided in the reactor housing intermediate the lower portion and the upper portion, wherein the passageway is configured to provide an auxiliary flow of primary coolant to the reactor core to augment the flow of the primary coolant out of the upper portion of the reactor housing and into the lower portion.

A nuclear reactor module is disclosed as comprising a reactor vessel and a reactor housing mounted inside the reactor vessel, wherein the reactor housing comprises a shroud and a riser located above the shroud. A heat exchanger is proximately located about the riser, and a reactor core is located in the shroud. The nuclear reactor module further comprises a steam generator by-pass system configured to provide an auxiliary flow path of primary coolant to the reactor core to augment a primary flow path of the primary coolant out of the riser and into the shroud, wherein the auxiliary flow path of primary coolant exits the reactor housing without passing by the heat exchanger.

A method of cooling a nuclear reactor is disclosed. A primary coolant is circulated through a reactor housing comprising an upper riser and a lower shroud. A primary flow path of the primary coolant passes by a heat exchanger proximately located about the riser, and the primary coolant enters the lower shroud. A loss of coolant accident (LOCA) or a depressurization event is detected, and a fluid level of the primary coolant is decreased below the top of the riser. The primary flow path of primary coolant exits the riser as steam. An auxiliary flow path of primary coolant is circulated through an auxiliary passageway provided in the reactor housing, wherein the auxiliary flow path of primary coolant exits the reactor housing without passing by the heat exchanger. The primary coolant from the auxiliary flow path is combined with the primary coolant from the primary flow path that enters the lower shroud.

Other aspects will become more readily apparent from the following detailed description of the embodiments, which proceeds with reference to the accompanying drawings.

DETAILED DESCRIPTION

Various embodiments disclosed or referred to herein may be operated consistent, or in conjunction, with features found in co-pending U.S. application Ser. No. 11/941,024 which is herein incorporated by reference in its entirety.

Figure 2:
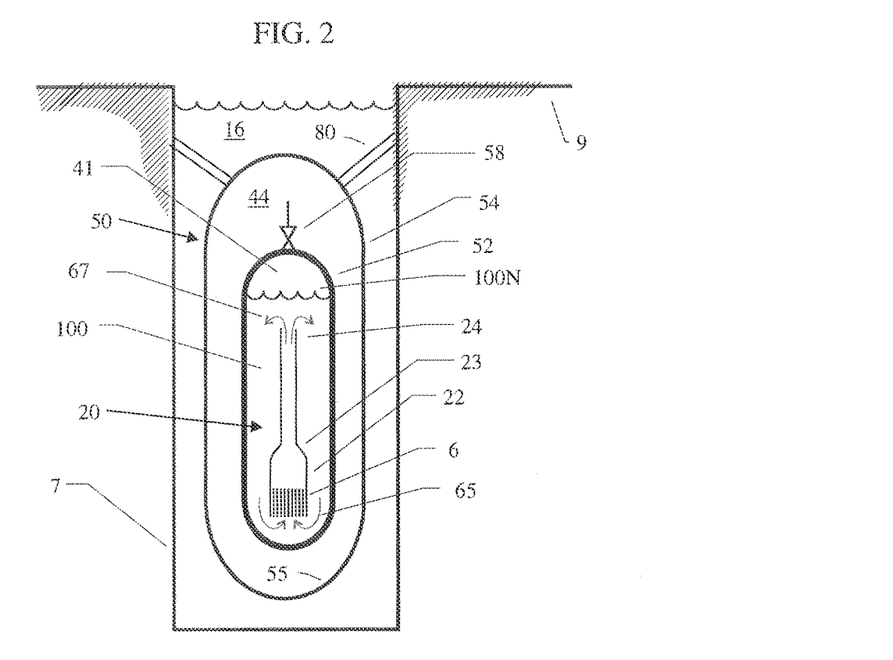
FIG. 2 illustrates a power module assembly comprising an internally dry containment.

FIG. 2 illustrates a power module assembly 50 comprising an internally dry containment vessel 54. The containment vessel 54 is cylindrical in shape, and has spherical, domed, or ellipsoidal upper and lower ends. The entire power module assembly 50 may be submerged in a pool of water 16 which serves as an effective heat sink. The pool of water 16 and the containment vessel 54 may further be located below ground 9 in a reactor bay 7. The containment vessel 54 may be welded or otherwise sealed to the environment, such that liquids and gas do not escape from, or enter, the power module assembly 50. The containment vessel 54 may be supported at any external surface.

In one embodiment, the containment vessel 54 is suspended in the pool of water 16 by one or more mounting connections 80. A reactor vessel 52 is located or mounted inside the containment vessel 54. An inner surface of the reactor vessel 52 may be exposed to a wet environment including a coolant 100 or liquid, such as water, and an outer surface may be exposed to a dry environment such as air. The reactor vessel 52 may be made of stainless steel or carbon steel, may include cladding, and may be supported within the containment vessel 54.

The power module assembly 50 may be sized so that it can be transported on a rail car. For example, the containment vessel 54 may be constructed to be approximately 4.3 meters in diameter and 17.7 meters in height (length). Refueling of the reactor core 6 may be performed by transporting the entire power module assembly 50 by rail car or overseas, for example, and replacing it with a new or refurbished power module assembly which has a fresh supply of fuel rods.

The containment vessel 54 encapsulates and, in some conditions, cools the reactor core 6. It is relatively small, has a high strength and may be capable of withstanding six or seven times the pressure of conventional containment designs in part due to its smaller overall dimensions. Given a break in the primary cooling system of the power module assembly 50 no fission products are released into the environment. Decay heat may be removed from the power module assembly 50 under emergency conditions.

The reactor core 6 is illustrated as being submerged or immersed in a primary coolant 100, such as water. The reactor vessel 52 houses the coolant 100 and the reactor core 6. A reactor housing 20 comprises a shroud 22 in a lower portion and a riser 24 in an upper portion of the reactor housing 20. The shroud 22 surrounds the reactor core 6 about its sides and serves to direct the coolant 100 (shown as coolant flow 65, 67) up through the riser 24 located in the upper half of the reactor vessel 52 as a result of natural circulation of the coolant 100.

In one embodiment, the reactor vessel 52 is approximately 2.7 meters in diameter and includes an overall height (length) of 13.7 meters. The reactor vessel 52 may include a predominately cylindrical shape with ellipsoidal, domed or spherical upper and lower ends. The reactor vessel 52 is normally at operating pressure and temperature. The containment vessel 54 is internally dry and may operate at atmospheric pressure with wall temperatures at or near the temperature of the pool of water 16.

The containment vessel 54 substantially surrounds the reactor vessel 52 and may provide a dry, voided, or gaseous environment identified as containment region 44. Containment region 44 may comprise an amount of air or other fill gas such as Argonne or other noble gas. The containment vessel 54 includes an inner surface 55 or inner wall which is adjacent to the containment region 44. The containment region 44 may include a gas or gases instead of or in addition to air. In one embodiment, the containment region 44 is maintained at or below atmospheric pressure, for example as a partial vacuum. Gas or gasses in the containment vessel may be removed such that the reactor vessel 52 is located in a complete or partial vacuum in the containment region 44.

During normal operation, thermal energy from the fission events in the reactor core 6 causes the coolant 100 to heat. As the coolant 100 heats up, it becomes less dense and tends to rise up through the riser 24. As the coolant 100 temperature reduces, it becomes relatively denser than the heated coolant and is circulated around the outside of the annulus 23, down to the bottom of the reactor vessel 52 and up through the shroud 22 to once again be heated by the reactor core 6. This natural circulation causes the coolant 100 (shown as coolant flow 65) to cycle through the heat exchanger 35, transferring heat to a secondary coolant, such as the secondary cooling system 30 of FIG. 1 to generate electricity.

Figure 3:
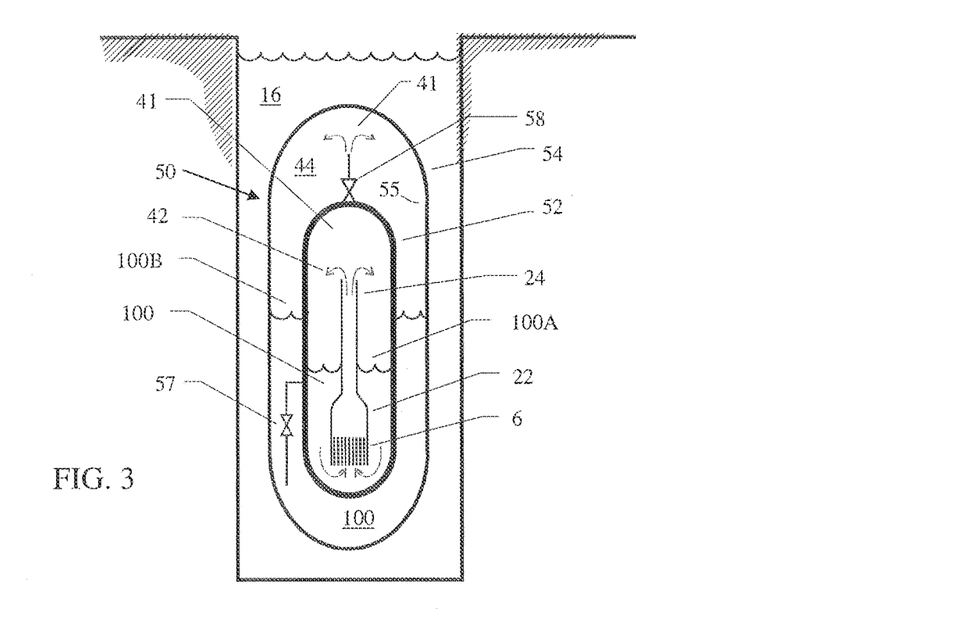
FIG. 3 illustrates the power module assembly of FIG. 2 during an emergency operation.

FIG. 3 illustrates the power module assembly 50 of FIG. 2 during an emergency operation. The emergency operation may include a response to an overheating of the reactor core 6, or an over-pressurization event of the reactor vessel 52, for example. During some emergency operations, the reactor vessel 6 may be configured to release the coolant 100 into the containment region 44 of the otherwise dry containment vessel 54. A decay heat of the reactor core 6 may be removed through condensation of the coolant 100 on the inner surface 55 of the containment vessel 54. Whereas the containment vessel 54 may be immersed in a pool of water 16, the inner surface 55 of the containment vessel 54 may be completely dry prior to the emergency operation or over-pressurization event.

A flow limiter 58 or steam vent may be mounted on the reactor vessel 52 for venting the coolant 100 into the containment vessel 54 during the emergency operation. The coolant 100 may be released into the containment vessel 54 as vapor 41, such as steam. The flow limiter 58 may be connected or mounted directly to an outer wall of the reactor vessel 52, without any intervening structures such as piping or connections. The condensation of the vapor 41 may reduce pressure in the containment vessel 54 at approximately the same rate that the vented vapor 41 adds pressure to the containment vessel 54.

Coolant 100 that is released as vapor 41 into the containment vessel 54 condenses on the inner surface 55 of the containment vessel 54 as a liquid. The condensation of the vapor 41 causes the pressure in the containment vessel 54 to decrease, as the vapor 41 is transformed into the liquid coolant 100. A sufficient amount of heat may be removed from the power module assembly 50 through the condensation of the vapor 41 on the inner surface 55 of the containment vessel to manage the removal of decay heat from the reactor core 6. In one embodiment, there is no release of the liquid coolant 100 from the reactor vessel 52 even during an emergency operation. The condensed coolant 100 descends to the bottom of the containment vessel 54 and collects as a pool of liquid. As more vapor 41 condenses on the inner surface 55, the level of the coolant 100 in the bottom of the containment vessel 54 gradually rises. Heat stored in the vapor 41 is transferred through the walls of the containment vessel 54 into the pool of water 16 that acts as an ultimate heat sink. Heat stored in the coolant 100 located at the bottom of the containment vessel 54 is transferred through liquid convection and conduction heat transfer on the inner surface 55.

Heat removed from the steam or vapor 41 may be transferred to the relatively cold inner surface 55 through condensation on the inside walls of the cold containment vessel 54 and by natural convection from the hot coolant to the inner surface 55. Heat may be transferred to the pool of water 16 by conduction through the containment vessel walls and through natural convection on an outside surface of the containment vessel 54. The coolant 100 remains confined within the power module assembly 50 after the reactor core 6 becomes overheated and during the emergency operation. The heat transferred to the pool of water 16 may provide adequate passive decay heat removal for three or more days without any operator intervention.

The containment vessel 54 may be designed to withstand the maximum pressure that would result given an instantaneous release of the high-pressure fluid from the reactor vessel 52 into the containment vessel 54. The pressure inside the containment vessel 54 may be designed to approximately equilibrate with the pressure inside the reactor vessel 52, reducing break flow caused by the pressure difference and resulting in coolant level 100A in the reactor vessel 52 and coolant level 100B in the containment vessel 54 as shown in FIG. 3. The coolant level 100B is shown elevated with respect to the coolant level 100A due to an amount of hydrostatic driving force required for flow through the lower valves 57 back into the reactor vessel 52. Differences in coolant levels 100A and 100B may also exist due to a pressure difference in the reactor vessel 52 relative to the containment vessel 54 due to the pressure drop of the steam flow valve 58. FIG. 3 shows that the coolant levels 100A and 100B may equilibrate as a result of a hydrostatic head that is generated by in imbalance of the coolant levels. Coolant level 100A in the reactor vessel 52 remains above the top of the reactor core 6, keeping the reactor core 6 covered with coolant 100 at all times. The coolant level 100A is maintained by steam or vapor being emitted from the riser 24 (shown as coolant flow 42) which condenses on the inner surface 55 of the reactor vessel 52 before collecting at the bottom of the reactor vessel 52 to be re-circulated through the reactor core 6.

A flow valve 57 may be provided to allow the coolant 100 to flow from the containment vessel 54 back into the reactor vessel 52 once an appropriate or predetermined condition of the coolant levels 100A, 100B is achieved. Coolant 100 that is allowed to reenter the reactor vessel 52 through the flow valve 57 replenishes the coolant 100 that was vented as vapor 41 through the flow limiter 58. The flow of coolant 100 through the flow valve 57 may be achieved through the natural circulation of the passive system due to the different coolant densities and coolant levels that result from temperature differences and valve coolant flow in the vessels 52, 54.

Whereas a complete or perfect vacuum may be commercially or technically impractical to achieve or maintain, a partial vacuum may be created in the containment vessel 54. Any reference to a vacuum herein is therefore understood to be either a partial or complete vacuum. In one embodiment, the containment region 44 is maintained at a vacuum pressure that significantly reduces convective and conductive heat transfer through the containment gases. By substantially removing gases from the containment region 44, for example by maintaining a vacuum within the containment vessel 54, an initial rate as well as subsequent rates of condensation of vapor 41 on the inner surface 55 are increased. Increasing the rate of condensation increases the rate of heat transfer through the containment vessel 54.

In the event of a loss of the vacuum in the containment region 44, the introduced vapor or liquid provide a further passive safety cooling mechanism to transfer heat between the reactor vessel 52 and the containment vessel 54 through natural convection. For example, by reducing or eliminating the thermal insulation, for example as provided by a vacuum, a more effective heat transfer from the reactor vessel 52 can be made during an emergency operation due to the condensed liquid coolant 100 which pools at the bottom of the containment vessel 54. Heat is transferred from the reactor vessel 52 through the liquid coolant 100 to the containment vessel 54.

Figure 4:
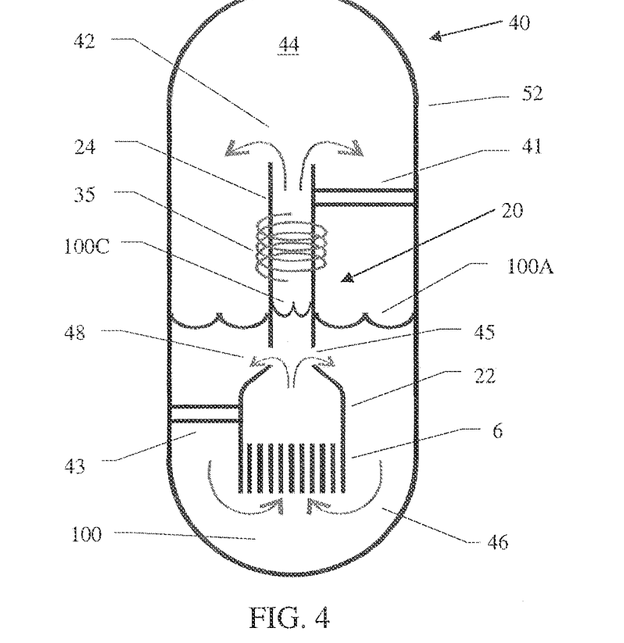
FIG. 4 illustrates an embodiment of a power module comprising a steam generator flow by-pass system during an emergency operation.

FIG. 4 illustrates an embodiment of a power module assembly 40 comprising a steam generator flow by-pass system 45 during an emergency operation, such as a loss of coolant accident (LOCA) or an over-pressurization event. Whereas the power module assembly 40 is described with reference to embodiments illustrated in FIGS. 2-3, it should be understood that many or all of the features could be applied to the nuclear power system described with respect to FIG. 1 as well as conventional power systems.

A reactor housing 20 is mounted inside the reactor vessel 52, wherein the reactor housing 20 comprises the shroud 22 and the riser 24 located above the shroud 20. The heat exchanger 35 is proximately located about the riser 24. The reactor core 6 is located in the shroud 22. The riser 24 is shown illustrated as being attached to the reactor vessel 52 by an upper attaching member 41, whereas the shroud is shown illustrated as being attached to the reactor vessel 52 by a lower attaching member 43.

The steam generator flow by-pass system 45 is configured to provide an auxiliary flow 48 of primary coolant to the reactor core 6 to augment a flow of the primary coolant 100 out of the riser 24 and into the shroud 22. The auxiliary flow 48 of primary coolant exits the reactor housing 20 without passing by the heat exchanger 35. The steam generator flow bypass system 45 may provide a hydraulic connection through one or more components of the reactor housing 20. In one embodiment, the steam generator flow by-pass system 45 provides a hydraulic connection through the annulus (ref. 123 FIG. 1) located intermediate the riser 24 and the shroud 22.

The coolant flow 42 out of the upper portion (e.g. riser 24) of the reactor housing 20 comprises steam, wherein the auxiliary flow 48 of primary coolant comprises a mixture of two-phase coolant, such as boiling water. Coolant flow 42 exiting the riser 24 may comprise less coolant 100 by mass flow rate as compared to the coolant flow 67 (FIG. 2) during normal operations (e.g. full power operation). Auxiliary flow 48 may therefore serve to make up some of the lost flow rate, such that the coolant flow 46 entering the shroud 22 is augmented to at or near the same flow rate as coolant flow 65 in FIG. 2 during normal operation.

In contrast to the coolant level 100N being above the outlet or top of the riser 24 shown in FIG. 2 during normal operating conditions, in the embodiment illustrated by FIG. 4 the coolant level 100A is shown below the top of the riser 24 during the emergency operation. Whereas the reactor housing 20 is shown completely submerged in primary coolant 100 in FIG.

2, the reactor housing 20 is only partially submerged in the coolant 100 as illustrated in FIG. 4. The level of the primary coolant 100 remains above the passageway 45 during normal operation, as well as during an off-normal operation, shutdown or emergency operation, when steam generator by-pass occurs.

During normal operating conditions, the coolant flow 65 may be comprised of predominantly or exclusively single phase coolant, for example in a pressurized water reactor design (PWR). Accordingly, a flow of single phase coolant circulates through the reactor core 6 as coolant flow 65 and out the riser 24 as coolant flow 67 (see FIGS. 2 and 5). This provides for single-phase convection heat transfer at the surface of the fuel cladding in the reactor core 6.

When a LOCA occurs and the coolant level 100A drops below the top of the riser 24, as illustrated in FIG. 4, the flow of single phase coolant may be interrupted. When pressure or temperature variations provide for conditions where the saturation conditions are surpassed, phase-change heat transfer may occur. Two-phase coolant may develop as it passes through the reactor core 6 which may then exit the reactor housing 20 via coolant flow 42 as steam which condenses on the inside wall of the reactor vessel 52. By including the auxiliary flow 48 through the steam generator flow by-pass system 45, convective heat transfer is provided to the reactor core 6, in addition to the heat transfer that occurs through steam generation.

The level of coolant 100C within the riser 24 during the LOCA, may drop down to a level that is approximately equal to that of the coolant level 100A on the outside (downcomer) of the reactor housing 20 when the power module achieves a steady state condition. A steady state condition may occur when the coolant flow 46 entering the shroud 22 is equal to the combined flow rate of the coolant flow exiting the riser 24 and the auxiliary flow 48 exiting the steam generator flow by-pass system 45. The steam generator flow by-pass system 45 is located above the reactor core 6 to optimize coolant flow through the fuel rods.

In one embodiment, the steam generator flow by-pass system 45 comprises a passageway provided in the reactor housing 20 intermediate the lower portion (e.g. shroud 22) and the upper portion (e.g. riser 24) of the housing 20, wherein the passageway is configured to provide the auxiliary flow 48 of primary coolant to the reactor core 6 which augments the flow of the primary coolant 100 out of the upper portion of the reactor housing 20 and into the lower portion. The auxiliary flow 48 of primary coolant accordingly bypasses the heat exchanger 35, located proximately about the upper portion of the reactor housing 20.

The passageway 45 may be closed during a full power operation of the power module assembly 40, whereas during an emergency operating procedure, the passageway 45 is configured to open. Similarly, the passageway 45 may be configured to open during a shutdown, or power-down operation, including a LOCA or over-pressurization event. In one embodiment, the passageway remains open during all modes of operation, whereas the auxiliary flow 48 is substantially minimized or reduced to zero during normal operations of the power module assembly 40.

Figure 5:
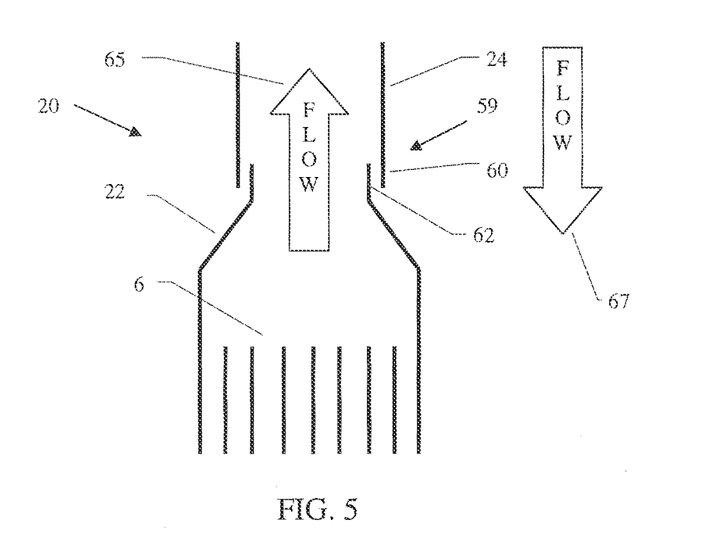
FIG. 5 illustrates an embodiment of a power module comprising a steam generator flow by-pass system during normal operating conditions.

FIG. 5 illustrates an embodiment of a power module comprising a steam generator flow by-pass system 59 during normal operating conditions. The steam generator flow bypass system 59 comprises an opening or passageway through the reactor housing 120. For example, the passageway may be located between or through a lower end 60 of the riser 24 and an upper end 62 of the shroud 22. The coolant flow 65 passes through the reactor core 6 located in the shroud 22 before exiting the riser 24 as coolant flow 67. During normal operations, little or none of the coolant flow 65 escapes through the steam generator flow bypass system 59. By prohibiting or reducing a flow rate through the steam generator flow by-pass system 59, a maximum flow of coolant passes by the heat exchanger 35 to remove heat from the reactor core 6. Accordingly, the mass flow rate of coolant flow 65 is approximately equal to that of coolant flow 67.

Figure 6A:
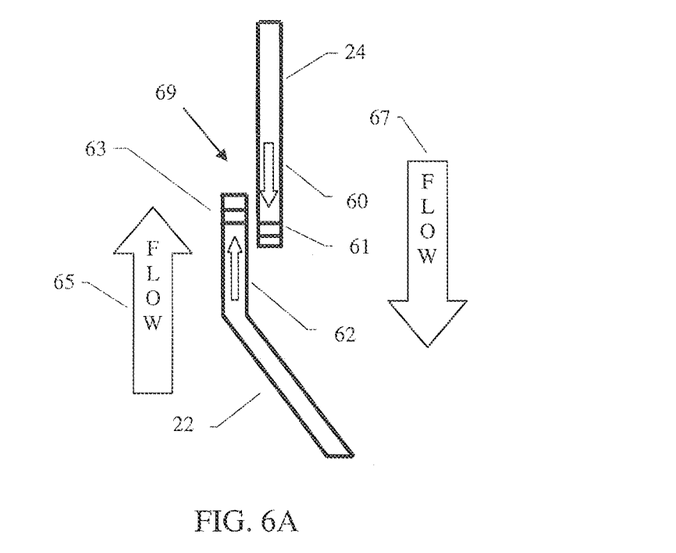
FIG. 6A illustrates an embodiment of a steam generator flow by-pass system during normal operating conditions.

FIG. 6A illustrates an embodiment of a steam generator flow by-pass system 69 during normal operating conditions, such as when a power module is operating at full power. During normal operation, the power module generates an operating temperature that is typically higher than a temperature associated with reactor start-up, reactor shut-down, or other operating conditions. Different temperatures may be generated at different locations within the coolant 100 as a result of interaction with the heat exchanger 35 (FIG. 4). At normal operating temperatures, coolant flow 65 and 67 behave substantially as described with respect to FIGS. 2 and 5. Different components of the reactor housing 20 may undergo different amounts of thermal expansion, as a result of the difference in operating temperature or as a result of differences in thermal properties of the various components. For example, some components may be made out of different materials, composition, or amount (e.g. thickness), such that one component may expand or retract to a greater degree than another component.

In one embodiment, a direction of expansion or contraction of the shroud 22 and the riser 24 are in opposite directions. For example, while the riser 24 expands toward the bottom of the reactor vessel 52 (FIG. 2), the shroud 22 expands toward the top of the reactor vessel 52. This relationship is diagrammatically illustrated by the downward and upward facing arrows at the lower end 60 of the riser 24 and the upper end 62 of the shroud 22, respectively. Expansion of the components in opposite directions may be accomplished by attaching the riser 24 to the upper attaching member 41 and by separately attaching the shroud 22 to the lower attaching member 43 (FIG. 4).

A passageway 63 in the upper end 62 of the shroud 22 is shown dislocated with a passageway 61 in the lower end 60 of the riser 24. With the shroud 22 and riser 24 in the thermally expanded condition, the dislocated passageways 61, 63 do not line up, such that little or none of the coolant flow 65 is allowed to pass through the steam generator flow bypass system 69.

Figure 6B:
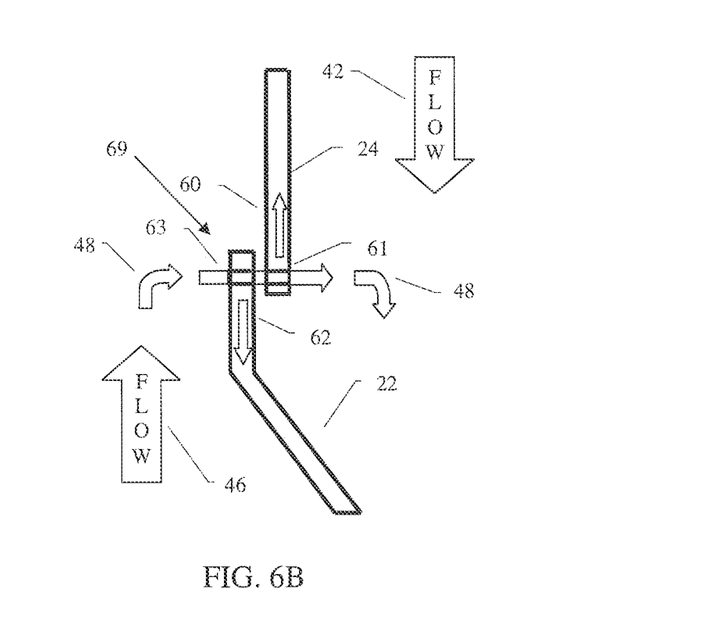
FIG. 6B illustrates an embodiment of the steam generator flow by-pass system of FIG. 6A during a power-down operation.

FIG. 6B illustrates an embodiment of the steam generator flow by-pass system 69 of FIG. 6A during a power-down operation. The power down operation may include a reactor shut-down, reactor trip or SCRAM, LOCA, or over pressurization event, for example. During the power-down operation, temperatures in the reactor vessel 52 (FIG. 2) tend to decrease, which results in a contraction or retraction of various reactor components. For example, while the riser 24 contracts toward the top of the reactor vessel 52 (FIG. 2), the shroud 22 retracts toward the bottom of the reactor vessel 52. This relationship is diagrammatically illustrated by the upward and downward directed arrows at the lower end 60 of the riser 24 and the upper end 62 of the shroud 22, respectively. The riser 24 and the shroud 22 may expand or contract at different amounts for the same change in temperature, in which case the directions of expansion and retraction may be relative to each other.

The passageway 63 in the upper end 62 of the shroud 22 is shown aligned with the passageway 61 in the lower end 60 of the riser 24, allowing an auxiliary flow 48 of coolant to pass through the steam generator flow by-pass system 69. With the shroud 22 and riser 24 in the thermally retracted condition, the co-located passageways 61, 63 line-up to form a through-passage, such that the auxiliary flow 48 is combined with coolant flow 42. In one embodiment, the passageway 61, 63 opens due to a change in temperature within the reactor vessel 52 (FIG. 2), wherein a difference in rate of thermal expansion between the shroud 22 and the riser 24 causes the passageway 61, 63 to open. A flow rate of the auxiliary flow 48 may vary according to the change in temperature, a degree of alignment between the passageways 61,63, or the number of passageways provided in the reactor housing 20. The auxiliary flow 48 of coolant exits the reactor housing 20 without passing by or through the heat exchanger 35 (FIG. 4).

Figure 7:
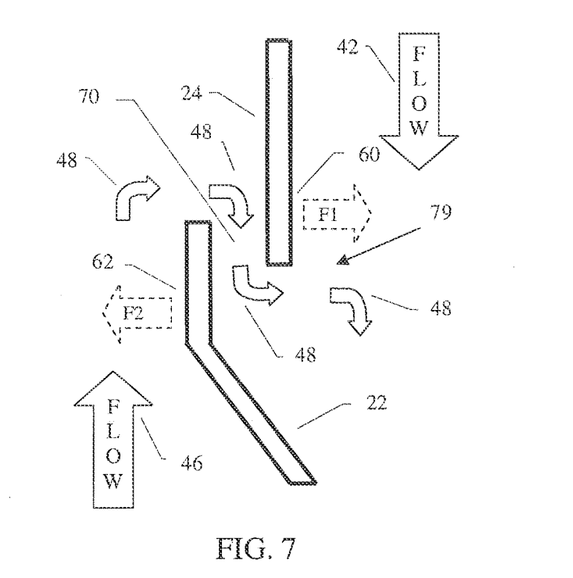
FIG. 7 illustrates an embodiment of a steam generator flow by-pass system comprising a through-passage.

FIG. 7 illustrates an embodiment of a steam generator flow by-pass system 79 comprising a through-passage 70. The through-passage 70 may be formed between the lower end 60 of the riser 24 and the upper end 62 of the shroud 22. The lower end 60 and upper end 62 are shown overlapping each other, such that the auxiliary flow 48 circulates through the through-passage 70. FIG. 7 may be understood as representing the flow of coolant during a shut-down or power-down operation, in which coolant flow 42 provides a reduced flow rate as compared to coolant flow 67 of FIG. 5. In FIG. 5, during normal operation of the power module 40, coolant flows 65, 67 may be sufficiently strong such that little or no auxiliary flow escapes from the steam generator flow by-pass system 59. Flow paths through the riser 24 may provide the path of least resistance during normal operation.

During a shut-down operation, or LOCA, where coolant flow 42 may be reduced, auxiliary flow 48 may be allowed to exit the through-passage 70 through natural convection, as coolant flow 46 exceeds the flow rate of coolant flow 42. In one embodiment, the primary coolant exits the steam generator flow by-pass system 79 as a result of a decrease in flow rate of the coolant flow 42 of the primary coolant out of the riser 24. The decrease in flow rate may correspondingly decrease an amount of eddies that otherwise form in the through-passage 70 during normal operating conditions, allowing the coolant to "boil over" through the steam generator flow by-pass system 79.

In the embodiment illustrated in FIG. 7 as well as the other various embodiments described and illustrated herein, the auxiliary flow 48 of primary coolant may exit the reactor housing 20 due to natural convection, or natural circulation of the coolant. A two-phase state of the coolant may promote auxiliary flow 48 of coolant to pass through the steam generator flow by-pass system, whereas most or all of the coolant would otherwise exit out the riser 24 when the coolant is in a single-phase state (e.g. during normal operating conditions). Passively cooling the reactor core 6 (FIG. 5) reduces or eliminates the need for providing moving or mechanical parts, such as motors.

In one embodiment, a distance between the overlapped section of the lower end 60 and upper end 62 increases or decreases with a change in temperature of the power module 40. During a decrease in reactor temperature, forces F1 and F2 may act on the ends 60,62 of the riser 24 and shroud 22 to increase the size of the through-passage 70 and provide for an increase in auxiliary flow 48. Whereas during an increase in reactor temperature, the size of the through-passage 70 may decrease as the distance between the overlapped section of the ends 60, 62 decreases, resulting in the auxiliary flow 48 decreasing or ceasing to flow. A flow rate of the auxiliary coolant 48 may vary with a change in reactor temperature and associated change in size or flow area of the through-passage 70.

Figure 8:
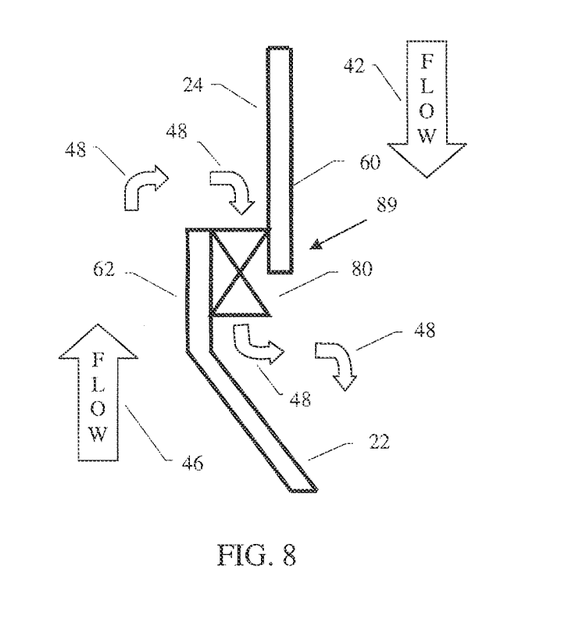
FIG. 8 illustrates an embodiment of a steam generator flow by-pass system comprising a valve.

FIG. 8 illustrates an embodiment of a steam generator flow by-pass system 89 comprising a valve 80 positioned near the lower end 60 of the riser 24 and the upper end 62 of the shroud 22. Auxiliary flow 48 may be allowed to flow similarly as with regards to the description of FIG. 7, whereas the valve 80 may be provided to limit a direction of the coolant flow 48 in a single direction. In one embodiment, valve 80 is a unidirectional valve that limits the direction of coolant flow 48 from within the reactor housing 20 to outside of the reactor housing 20. In one embodiment, the valve 80 is always open, and the rate of auxiliary flow 48 is governed by the flow rate of coolant flow 42, 46 or coolant flow 65, 67 (FIG. 5). In another embodiment, valve 80 is actuated (e.g. opened) upon detection of a shutdown operation or reactor scram, for example, such that valve 80 is otherwise closed during normal (e.g. full power) reactor operation.

Figure 9:
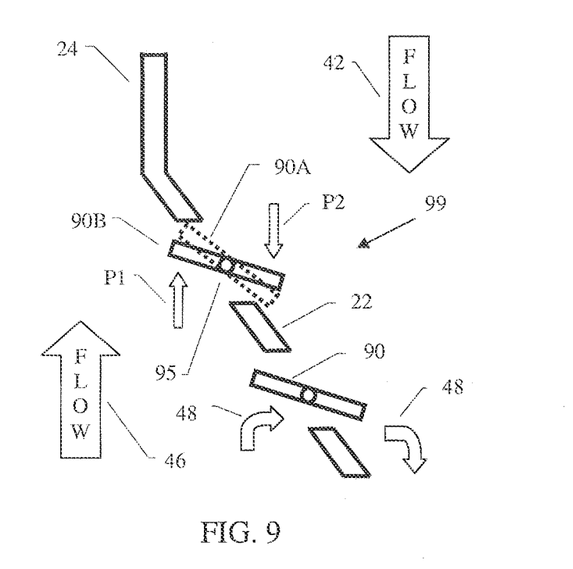
FIG. 9 illustrates an embodiment of a steam generator flow by-pass system comprising one or more baffles.

FIG. 9 illustrates an embodiment of a steam generator flow by-pass system 99 comprising one or more baffles 90. The auxiliary flow 48 through the baffles 90 may operate or function similarly as described above with respect to the embodiments illustrated in FIGS. 4-8. For example, during normal operation of the power module 40, little or no auxiliary flow 48 may be allowed to exit through the one or more baffles 90. During a shut-down operation, auxiliary flow 48 through the baffles 90 may be enabled or increased.

In one embodiment, the one or more baffles 90 rotate about a pivot to open or close. Baffle 90A illustrates a baffle in a closed position, whereas baffle 90B illustrates a baffle in an open position. The one or more baffles 90 may open or close depending on the flow rate of the coolant flow 42,46, as these flow rates may exert pressure PI, P2 on the one or more baffles 90. If a flow rate or pressure differential between pressures PI, P2 is great enough, the one or more baffles 90 may close, and prohibit a flow of coolant through the steam generator flow by-pass system 99. The steam generator flow by-pass system 99 may further comprise a return mechanism, such as a spring, that returns the one or more baffles 90 to an open position when the flow rate drops below some predetermined threshold. In one embodiment, the steam generator flow by-pass system 99 comprises a screen with miniature louvers or baffles that allow the passage of boiling coolant, but prohibit or limit the passage of single phase coolant.

Figure 10:
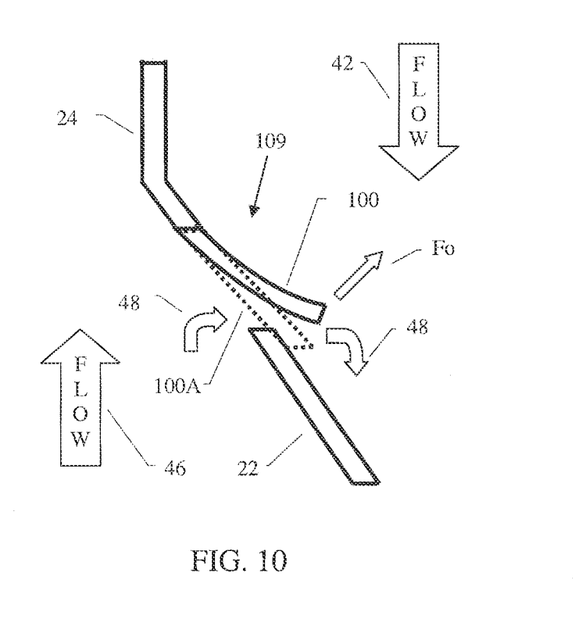
FIG. 10 illustrates an embodiment of a steam generator flow by-pass system comprising a temperature activated passage.

FIG. 10 illustrates an embodiment of a steam generator flow by-pass system 109 comprising a temperature activated passage 100. The passage 100 may be configured to open due to a change in temperature within the reactor vessel 52 (FIG. 4). In one embodiment, the steam generator flow by-pass system 109 comprises a bi-metallic cover located over the passageway, wherein the bi-metallic cover comprises materials having different thermal 5 expansion rates or properties. In one embodiment, the passageway is formed between the riser 24 and the shroud 22. A first end of the temperature activated passage 100 may be fixed or otherwise attached to the reactor housing 20 (FIG. 4). Due to the different thermal expansion properties, a second end of the temperature activated passage 100 may bend away from the reactor housing 20 with a force Fo as a reactor temperature decreases. A passageway through the reactor housing 20 may therefore be formed which allows the auxiliary flow 48 to exit the steam generator flow by-pass system 109. As the reactor temperature increases, the temperature activated passage 100 may relax, or bend back to cover the passageway (shown by reference 100A) and reduce or stop the auxiliary flow 48 from exiting the reactor housing 20.

Figure 11:
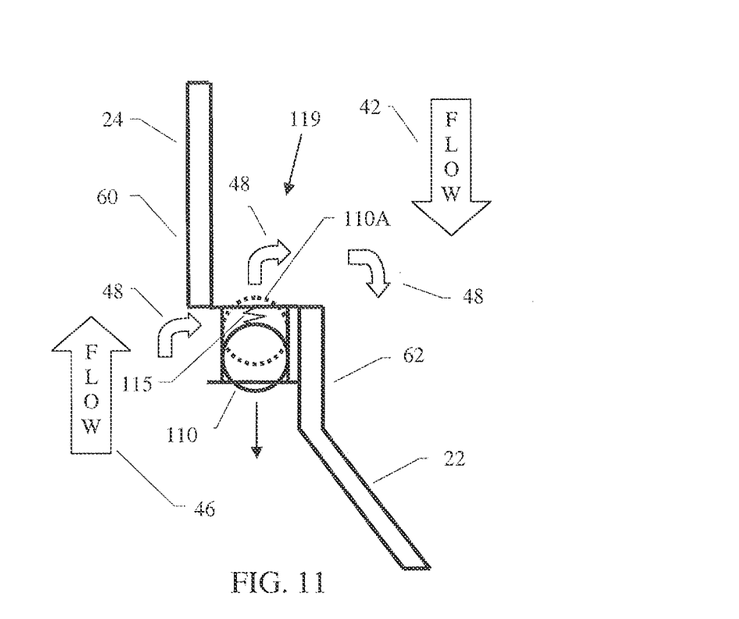
FIG. 11 illustrates an embodiment of a steam generator flow by-pass system comprising a ball check valve.

FIG. 11 illustrates an embodiment of a steam generator flow by-pass system 119 comprising a ball check valve 110. The ball check valve 110 may move in a bi-direction sense, such that in one position it allows the auxiliary flow 48 to pass through the steam generator flow by-pass system 119, whereas in a second position (e.g. shown as reference 110A) it limits or prohibits the release of auxiliary flow 48 out of the reactor housing 20.

The steam generator flow by-pass system 119 may comprise a return spring 115 that urges the ball check valve 110 toward the open, first position. The amount of force exerted by the return spring 115 may exceed the force due to the coolant flow 48 during a shut-down condition, for example. During normal operation, a flow rate due to coolant flow 65 (FIG. 5) may overcome the force exerted by the return spring 115, and place the ball check valve 110 in the closed, second position 110A. In another embodiment, the weight of the ball in the ball check valve provides the downward force of the ball check valve 110, replacing the need for the return spring 115.

In another embodiment, a spring is located near the bottom of the ball check valve 110, instead of as shown in FIG. 11. The spring expands during normal operation due to an increase in temperature, urging the ball check valve 110 toward the closed, second position 110A. The spring contracts during a power down condition due to a decrease in temperature, urging the ball check valve 110 toward the open, first position.

Figure 12:
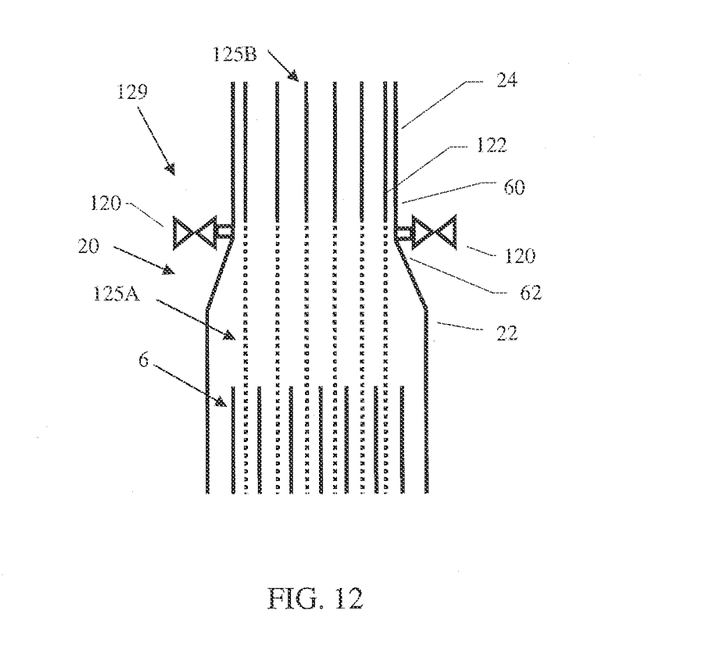
FIG. 12 illustrates an embodiment of a steam generator flow by-pass system actuated by control rods.

FIG. 12 illustrates an embodiment of a steam generator flow by-pass system 129 actuated by control rods 125A, 125B. The steam generator flow by-pass system 129 may comprise one or more vents or valves 120 attached to the reactor housing 20. In one embodiment, the steam generator flow by-pass system 129 is attached to the reactor housing 20 intermediate the shroud 22 and the riser 24.

When the control rods (identified as reference number 125B) are removed from the reactor core 6, the steam generator flow by-pass system 129 may be actuated to be closed, such that little or no auxiliary flow is allowed to exit the reactor housing 20. The steam generator flow by-pass system 129 may be closed, for example, during normal or full-power operation of the power module 40. When the control rods (identified as reference number 125A) are inserted into the reactor core 6, the steam generator flow by-pass system 129 may be actuated to be open, such that the auxiliary flow is allowed to exit the reactor housing 20. The steam generator flow by-pass system 129 may be open, for example, during shut-down or a power down operation of the power module 40. One or more switches or sensors may determine when the control rods 125A, 125B are inserted or removed from the reactor core 6, and send a signal to actuate the steam generator flow by-pass system 129.

Figure 13:
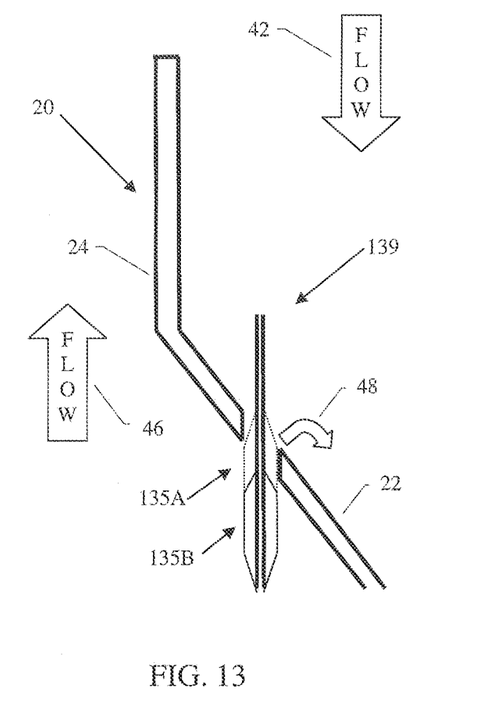
FIG. 13 illustrates an alternative embodiment of a steam generator flow by-pass system actuated by control rods

FIG. 13 illustrates an alternative embodiment of a steam generator flow by-pass system 139 actuated by control rods 135A, 135B. The steam generator flow by-pass system 139 may comprise one or more control rods designed such that when withdrawn (135A) for operation they obstruct the flow path of the by-pass system, and when inserted (135B) during power down conditions they provide an open passage to auxiliary coolant by-pass flow 48. The location of the control rods 135A, 135B allow or prevent the auxiliary flow of primary coolant to pass through the housing 20. In one embodiment, the steam generator flow bypass system 139 is attached to the reactor housing 20 intermediate the shroud 22 and the riser 24.

One or more switches or sensors may determine when the control rods are inserted 25 (135B) or removed (135A) from the reactor core 6.

Figure 14:
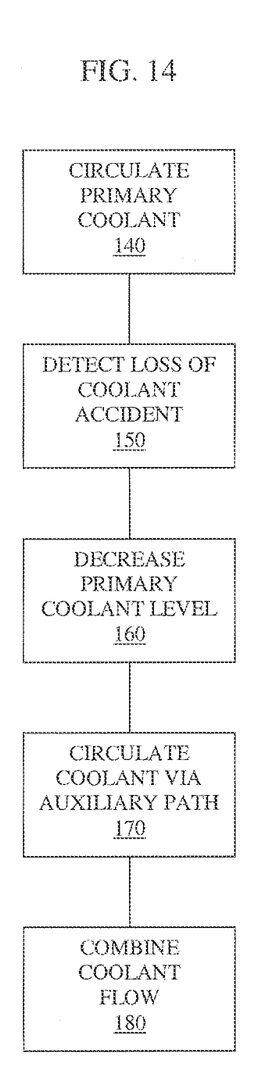
FIG. 14 illustrates a novel method of cooling a reactor core using a steam generator flow by-pass system.

FIG. 14 illustrates a novel method of cooling a reactor core using a steam generator flow by-pass system. The method may be understood to operate with, but not limited by, various embodiments illustrated herein as FIGS. 1-13.

At operation 140 a primary coolant is circulated through a reactor housing comprising an upper riser and a lower shroud, wherein a primary flow path of the primary coolant passes by a heat exchanger proximately located about the riser, and wherein the primary coolant enters the lower shroud.

At operation 150, a loss of coolant accident (LOCA) or a depressurization event is detected. The LOCA or depressurization event may indicate a reduced amount of coolant or pressure in the reactor vessel.

At operation 160, a fluid level of the primary coolant is decreased below the top of the riser, wherein the primary coolant exits the riser as steam. In one embodiment, the primary coolant that exits the riser as steam condenses as liquid coolant before being combined with an auxiliary flow path of the primary coolant that is circulated through an auxiliary passageway in the reactor housing.

At operation 170, the auxiliary flow path of the primary coolant is circulated through the auxiliary passageway provided in the reactor housing, wherein the auxiliary flow path of the primary coolant exits the reactor housing without passing by the heat exchanger. In one embodiment, the auxiliary flow path of the primary coolant circulates through the auxiliary passageway due to a difference in hydrostatic forces on either side of the passageway.

At operation 180, the primary coolant from the auxiliary flow path is combined with the primary coolant from the primary flow path that enters the lower shroud.

In one embodiment, chemical additives soluble in coolant of a nuclear reactor are combined with the primary coolant of a nuclear reactor, modifying the nuclear and chemical characteristics of the coolant. A loss of primary coolant inventory is detected, and a fluid level of the primary coolant is decreased such that the nominal flow path is interrupted or reduced. Production of steam occurs in the core region, and exits the riser as steam. Nonvolatile additives in the primary coolant are concentrated in the core, and coolant devoid of the non-volatile additives collects in regions observing condensation. The primary coolant is circulated through a passageway provided in the reactor housing, wherein the coolant devoid of additives is combined with the coolant with increased concentration of additives, providing mixing of the coolant streams and mitigating the concentration process. Circulating the auxiliary flow path of the primary coolant through the auxiliary passageway reduces a concentration of non-volatile additives in the primary coolant within the reactor housing.

Although the embodiments provided herein have primarily described a pressurized water reactor, it should be apparent to one skilled in the art that the embodiments may be applied to other types of nuclear power systems as described or with some obvious modification. For example, the embodiments or variations thereof may also be made operable with a boiling water reactor or more generally to any other integrated passive reactor design.

The rate of release of the coolant into the containment vessel, the rate of condensation of the coolant into a liquid, and the rate of increase of pressure in the containment vessel, as well as other rates and values described herein are provided by way of example only. Other rates and values may be determined through experimentation such as by construction of full scale or scaled models of a nuclear reactor.

Having described and illustrated the principles of the disclosure in a preferred embodiment thereof, it should be apparent that aspects may be modified in arrangement and detail without departing from such principles. We claim all modifications and variation coming within the spirit and scope of the following claims.

What is claimed is:

1. A power module assembly comprising:
a reactor housing;
a reactor core located in a lower portion of the reactor housing;
a heat exchanger proximately located about an upper portion of the reactor housing, the upper portion comprising a fluid exit for a primary coolant from the reactor housing, the lower portion comprising a fluid entry for the primary coolant to the reactor housing; and
a passageway provided in the reactor housing intermediate the lower portion and the upper portion, the passageway comprising a flow path for an auxiliary flow of the primary coolant to the fluid entry, the flow path adjustable based, at least in part, on a mode of operation of the power module assembly.

2. The power module assembly according to claim 1, wherein the flow path is in fluid communication with the fluid entry of the reactor housing without passing through the upper portion of the reactor housing.

3. The power module assembly according to claim 1, wherein during a loss of coolant accident, the flow of primary coolant out of the upper portion of the reactor housing comprises steam, and wherein the auxiliary flow of primary coolant comprises a mixture of two-phase coolant.

4. The power module assembly according to claim 1, wherein the flow path is closed or reduced based, at least in part, on a full power operation of the power module assembly.

5. The power module assembly according to claim 4, wherein the flow path is open based, at least in part, on a shut-down operation.

6. The power module assembly according to claim 5, wherein the shut-down operation comprises a loss of coolant accident or an over-pressurization event.

7. The power module assembly according to claim 1, wherein a level of the primary coolant is above an outlet of the upper portion of the reactor housing during full power operation, and wherein the level of primary coolant is below the outlet during a shutdown operation.

8. The power module assembly according to claim 7, wherein the level of the primary coolant remains above the passageway during the shut-down operation.

9. A nuclear reactor module comprising:
a reactor vessel;
a reactor housing mounted inside the reactor vessel, wherein the reactor housing comprises a shroud and a riser located above the shroud;
a heat exchanger proximately located about the riser;
a reactor core located in the shroud; and
a steam generator flow by-pass system configured to provide an auxiliary flow path, between the shroud and the riser, of primary coolant to the reactor core to augment a primary flow path of the primary coolant out of the riser and into the shroud, wherein the auxiliary flow path of primary coolant exits the reactor housing without passing by the heat exchanger, and the steam generator flow by-pass system comprises one or more baffles that adjustably control an opening area of the auxiliary flow path of the primary coolant.

10. The nuclear reactor module according to claim 9, wherein the auxiliary flow path of primary coolant exits the reactor housing due to a difference in hydrostatic forces on either side of the auxiliary flow path.

11. The nuclear reactor module according to claim 10, wherein the primary coolant exits the reactor housing as a result of a decrease in rate of the primary flow path of the primary coolant out of the riser.

12. The nuclear reactor module according to claim 9, wherein the one or more baffles are controllable to rotate about a pivot to open or close.

13. The nuclear reactor module according to claim 9, wherein the steam generator flow by-pass system comprises a unidirectional valve.

14. The nuclear reactor module according to claim 9, wherein the steam generator flow by-pass system forms a passageway for coolant to exit the reactor housing during a loss of coolant accident or a depressurization event.

15. The nuclear reactor module according to claim 14, wherein the passageway opens due to a change in temperature within the reactor vessel.

16. The nuclear reactor module according to claim 15, wherein the steam generator flow by-pass system comprises a bi-metallic cover located over the passageway, and wherein the bi-metallic cover comprises materials having different thermal expansion properties.

17. The nuclear reactor module according to claim 14, wherein a difference in rate of thermal expansion between the shroud and the riser causes the passageway to open.

18. The nuclear reactor module according to claim 17, wherein the riser and the shroud are separately attached to the reactor vessel.

19. A method of cooling a nuclear reactor comprising:
circulating a primary coolant through a reactor housing comprising an upper riser and a lower shroud, wherein a primary flow path of the primary coolant passes by a heat exchanger proximately located about the riser, and wherein the primary coolant enters the lower shroud;
detecting a loss of coolant accident or a depressurization event;
decreasing a fluid level of the primary coolant below the top of the riser, wherein the primary coolant exits the riser as steam;
adjustably controlling an auxiliary passageway provided in the reactor housing to form a fluid pathway through the reactor housing between the upper riser and the lower shroud;
circulating an auxiliary flow path of the primary coolant from the auxiliary passageway and through the fluid pathway; and
combining the primary coolant from the auxiliary flow path with the primary coolant from the primary flow path that enters the lower shroud.

20. The method according to claim 19, wherein the primary coolant that exits the riser as steam condenses as liquid coolant before being combined with the primary coolant of the auxiliary flow path.

21. The method according to claim 20, wherein the primary coolant of the auxiliary flow path circulates through the auxiliary passageway due to a difference in hydrostatic forces on either side of the passageway.

22. The method according to claim 19, wherein circulating the auxiliary flow path of the primary coolant through the auxiliary passageway reduces a concentration of nonvolatile additives in the primary coolant within the reactor housing.

23. A power module assembly comprising:
a reactor housing;
a reactor core located in a lower portion of the reactor housing;
a heat exchanger proximately located about an upper portion of the reactor housing, wherein primary coolant flows out of the reactor housing via the upper portion, and wherein the primary coolant flows into the reactor housing via the lower portion; and a passageway provided in the reactor housing intermediate the lower portion and the upper portion, the passageway configured to provide an auxiliary flow of primary coolant to the reactor core to augment the flow of the primary coolant out of the upper portion of the reactor housing and into the lower portion, and during a loss of coolant accident, the flow of primary coolant out of the upper portion of the reactor housing comprises steam and the auxiliary flow of primary coolant comprises a mixture of two-phase coolant.

24. A power module assembly comprising:

a reactor housing;

a reactor core located in a lower portion of the reactor housing;

a heat exchanger proximately located about an upper portion of the reactor housing, wherein primary coolant flows out of the reactor housing via the upper portion, and wherein the primary coolant flows into the reactor housing via the lower portion; and a passageway provided in the reactor housing intermediate the lower portion and the upper portion, the passageway configured to provide an auxiliary flow of primary coolant to the reactor core to augment the flow of the primary coolant out of the upper portion of the reactor housing and into the lower portion, the passageway closed or reduced during a full power operation of the power module assembly.

25. A nuclear reactor module comprising:

a reactor vessel;

a reactor housing mounted inside the reactor vessel, wherein the reactor housing comprises a shroud and a riser located above the shroud;

a heat exchanger proximately located about the riser;

a reactor core located in the shroud; and a steam generator flow by-pass system configured to provide an auxiliary flow path of primary coolant to the reactor core to augment a primary flow path of the primary coolant out of the riser and into the shroud, wherein the auxiliary flow path of primary coolant exits the reactor housing without passing by the heat exchanger, wherein the steam generator flow by-pass system forms a passageway for coolant to exit the reactor housing during a loss of coolant accident or a depressurization event, and the passageway opens due to a change in temperature within the reactor vessel.

26. A nuclear reactor module comprising:

a reactor vessel;

a reactor housing mounted inside the reactor vessel, wherein the reactor housing comprises a shroud and a riser located above the shroud;

a heat exchanger proximately located about the riser;

a reactor core located in the shroud; and a steam generator flow by-pass system configured to provide an auxiliary flow path of primary coolant to the reactor core to augment a primary flow path of the primary coolant out of the riser and into the shroud, wherein the auxiliary flow path of primary coolant exits the reactor housing without passing by the heat exchanger, wherein the steam generator flow by-pass system forms a passageway for coolant to exit the reactor housing during a loss of coolant accident or a depressurization event, and a difference in rate of thermal expansion between the shroud and the riser causes the passageway to open.

27. A method of cooling a nuclear reactor comprising:

circulating a primary coolant through a reactor housing comprising an upper riser and a lower shroud, wherein a primary flow path of the primary coolant passes by a heat exchanger proximately located about the riser, and wherein the primary coolant enters the lower shroud;

detecting a loss of coolant accident or a depressurization event;

decreasing a fluid level of the primary coolant below the top of the riser, wherein the primary coolant exits the riser as steam;

circulating an auxiliary flow path of the primary coolant through an auxiliary passageway provided in the reactor housing, wherein the auxiliary flow path of the primary coolant exits the reactor housing without passing by the heat exchanger; and combining the primary coolant from the auxiliary flow path with the primary coolant from the primary flow path that enters the lower shroud, wherein circulating the auxiliary flow path of the primary coolant through the auxiliary passageway reduces a concentration of nonvolatile additives in the primary coolant within the reactor housing.

\* \* \* \* \*

UNITED STATES PATENT AND TRADEMARK OFFICE
CERTIFICATE OF CORRECTION

PATENT NO. : 8,824,619 B2 Page 1 of 1
APPLICATION NO. : 13/860750
DATED : September 2, 2014
INVENTOR(S) : Eric Paul Young, John T. Groome and Jose N. Reyes, Jr.

It is certified that error appears in the above-identified patent and that said Letters Patent is hereby corrected as shown below:

Title Page, column 1, item (73) (Assignee), line 1, delete "NuScale Powe," and insert
-- NuScale Power, --.

Signed and Sealed this
Ninth Day of December, 2014

Michelle K. Lee
*Deputy Director of the United States Patent and Trademark Office*